United States Patent
Brown et al.

[11] Patent Number: 5,996,207
[45] Date of Patent: Dec. 7, 1999

[54] TANK INSTALLATION METHOD

[75] Inventors: Paul A. Brown, Bellefontaine; Joe Henry, West Liberty; Masahiro Takahashi, Hilliard, all of Ohio

[73] Assignee: Honda of America Mfg., Inc., Marysville, Ohio

[21] Appl. No.: 09/075,964

[22] Filed: May 11, 1998

[51] Int. Cl.[6] .................................................. B60K 15/07
[52] U.S. Cl. ............................................... 29/464; 29/430
[58] Field of Search ........................... 29/430, 787, 795, 29/464; 414/225, 226, 909

[56] References Cited

U.S. PATENT DOCUMENTS

| | | | |
|---|---|---|---|
| 3,921,822 | 11/1975 | Dixon | 214/1 BB |
| 4,411,576 | 10/1983 | Smith et al. | 414/226 |
| 4,740,134 | 4/1988 | Dixon | 414/733 |
| 4,765,793 | 8/1988 | Goddeau | 414/416 |
| 4,779,336 | 10/1988 | Inoue et al. | 29/799 |
| 5,127,787 | 7/1992 | Beck et al. | 414/222 |
| 5,346,165 | 9/1994 | Frean et al. | 248/146 |
| 5,443,578 | 8/1995 | Davis, Jr. | 280/834 |
| 5,456,002 | 10/1995 | Barnhart et al. | 29/787 |
| 5,794,979 | 8/1998 | Kasuga et al. | 280/834 |
| 5,810,309 | 9/1998 | Augustine et al. | 248/313 |

FOREIGN PATENT DOCUMENTS 11019894   1/1999   Japan ............................... B25J 15/08

*Primary Examiner*—David P. Bryant
*Assistant Examiner*—Essama Omgba
*Attorney, Agent, or Firm*—Pearne, Gordon, McCoy & Granger LLP

[57] ABSTRACT

A method for installing a compressed natural gas tank assembly in an automobile. The method includes connecting the tank assembly to an arm, rotating the tank assembly about an axis a predetermined angular amount, inserting the tank assembly into the automobile, and rotating the tank assembly about the axis in a second, opposite direction the predetermined amount. The tank assembly is disposed over a desired location in the automobile and placed in engagement with the desired location.

9 Claims, 5 Drawing Sheets

TANK INSTALLATION METHOD

BACKGROUND OF THE INVENTION

1. Field of the Invention

The present invention generally pertains to automobiles having a compressed natural gas fuel supply and, more particularly, to a method for installing a compressed natural gas tank in an automobile.

2. Description of Related Art

One of the challenges encountered during assembly of a compressed natural gas automobile is the required installation of a CNG tank. In the past, installation of the tank was commonly a manual operation wherein one or more assemblers would physically lift and place the tank in the automobile. As can be appreciated, manual installation of the CNG tank is a time-consuming and labor intensive process which is not conducive to automated assembly lines. Accordingly, the manufacturing cost of such CNG automobiles was quite high, and not feasible for full scale production.

Accordingly, there exists a need in the art for a method to install a CNG tank into an automobile which may be incorporated into an automated assembly line and automated assembly processes. There also exists a need in the art for a support assembly for a CNG tank assembly which facilitates installation of the CNG tank assembly into an automobile.

SUMMARY OF THE INVENTION

The present invention is directed toward a method for installing a CNG tank assembly in an automobile, and toward a method for assembling an automobile. The present invention is further directed toward a CNG tank assembly installation method which is relatively fast and easy for workers to perform.

In accordance with the present invention, a method for installing a compressed natural gas tank assembly in an automobile includes the steps of:

securing a movable arm to the tank assembly, the movable arm defining an axis;

rotating the tank assembly about the axis a predetermined amount in a first direction;

inserting the tank assembly through an opening in the automobile;

rotating the tank assembly about the axis the predetermined amount in a second, opposite direction;

releasing the arm from the tank assembly; and securing the tank assembly to an interior surface of the automobile.

BRIEF DESCRIPTION OF THE DRAWINGS

These and further features of present invention will be apparent with reference to the following description and drawings, wherein.

DETAILED DESCRIPTION OF THE PREFERRED EMBODIMENT

Figure 3:
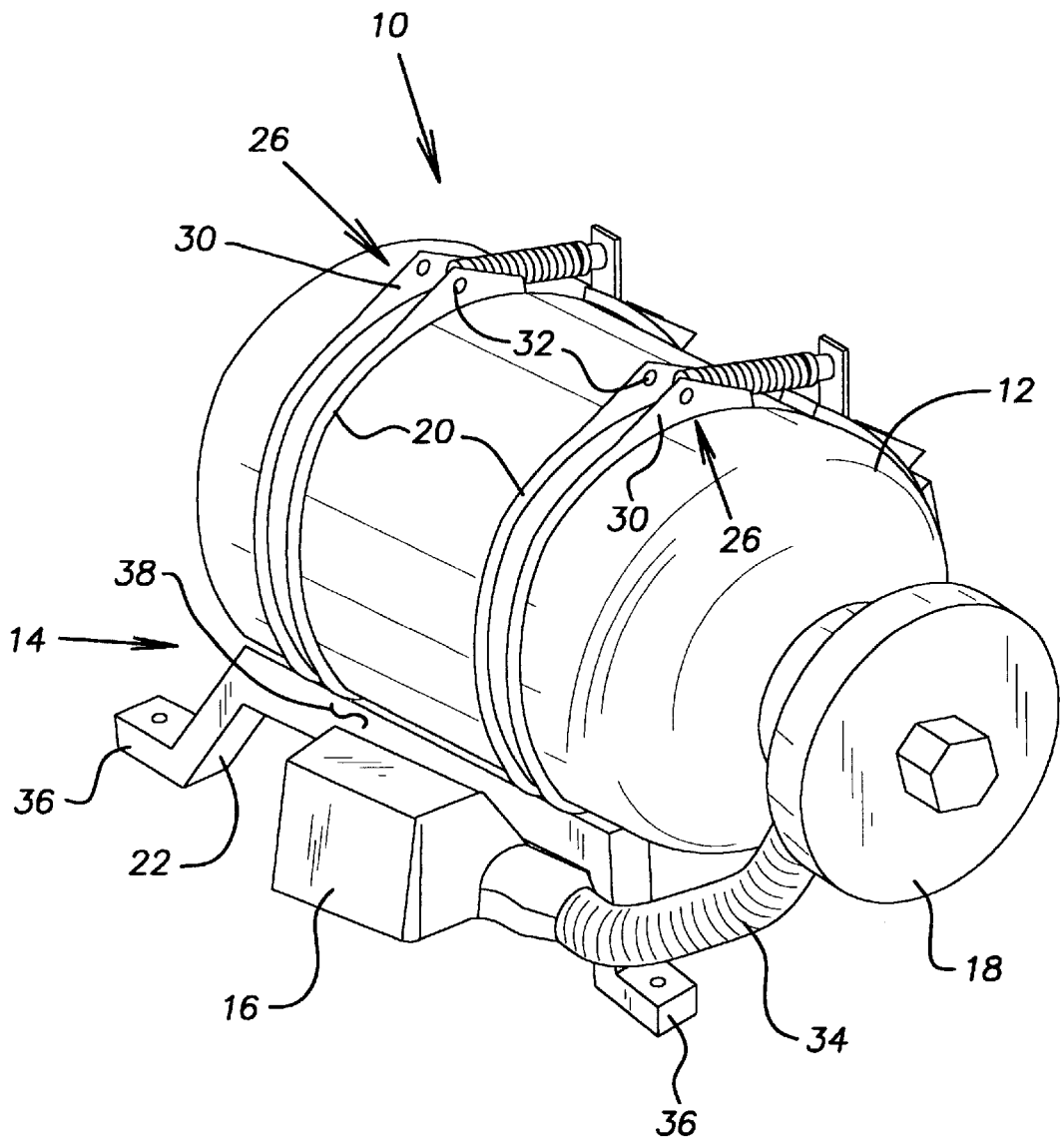
FIG. 3 is a perspective view of the CNG tank assembly according to the present invention.

With reference to FIG. 3, a CNG tank assembly 10 according to the present invention is shown to include a CNG tank 12, a support assembly 14, a joint box 16, and a tank head assembly 18.

The support assembly 14 includes a pair of band-type clamps 20 and front and rear supporting legs 22, 24. The clamps 20 extend around the circumference of the CNG tank 12 and are secured to the front and rear supporting legs 22, 24 and the joint box 16. Each of the band-type clamps 20 provide a receptacle 26 to which an arm 28 of a tank installation machine 29 (FIG. 1) is releasably connected, preferably in a quick-disconnect type fashion, as will be described more fully hereinafter. In the illustrated embodiment, the receptacle 26 is provided by a pair of upstanding flanges 30 in which aligned holes 32 are formed. Naturally, is contemplated that numerous quick disconnect couplings may be employed to quickly and releasably secure the tank installation machine arm 28 to the tank assembly 10 without departing from the scope of the present invention.

A conduit 34 extends from the joint box 16 to the tank head assembly 18. The joint box 16 defines a plurality of passageways by means of which conduits 64, 66, 68 (FIG. 2) on an exterior of the automobile may be connected to associated pipes (not shown) extending through the conduit 34 and communicating with the CNG tank 12 via the head assembly 18. Accordingly, pressurized gas can be supplied to, supplied from, and vented from the CNG tank 12 via the pipes, joint box 16, and conduits 64, 66, 68. The joint box 16 may also include a manual lock down valve (not shown) to regulate fluid communication between the conduits 64, 66, 68 and the CNG tank 12. The manual lock down valve is preferably provided on an underside of the joint box 16 so as to be accessible from an underside of the automobile following installation of the CNG tank assembly 10, as will be apparent from the following description. If more detailed information on the joint box is desired, reference should be made to commonly-owned and copending U.S. patent application Ser. No. 09/041,402, filed Mar. 12, 1998, the entire disclosure of which is expressly incorporated herein by reference.

The rear supporting leg 24 (FIG. 1) is generally planar while the front supporting leg 22 includes a pair of spaced-apart feet 36 and an intermediate rail 38 extending between and interconnecting the feet 36. The front and rear supporting legs 22, 24 are secured to the band-type clamps 20, as noted hereinbefore. It is noted that the shape or configuration of the supporting legs 22, 24 is dictated, to some extent, by the shape of the automobile floor panel 44 to which the legs are attached and, therefore, the present invention is not limited to the leg structure specifically disclosed herein.

The joint box 16 is disposed forwardly relative to the front supporting leg 22. Preferably, the conduit 34 extending from the joint box 16 to the CNG tank 12 is draped over a portion of the front supporting leg 22, and may be secured thereto to help prevent the conduit 34 from being tangled or damaged during the installation process, described hereinafter.

The CNG tank assembly 10 is adapted to be installed in an automobile 40 on an assembly line. Once properly positioned within the automobile 40, the joint box 16 is aligned with, and preferably extends through, an opening 42 (FIG. 4) formed in the floor or bottom panel 44 of the automobile 40. The legs 22, 24 are attached to the floor panel 44 by conventional mechanical fasteners.

Figure 1:
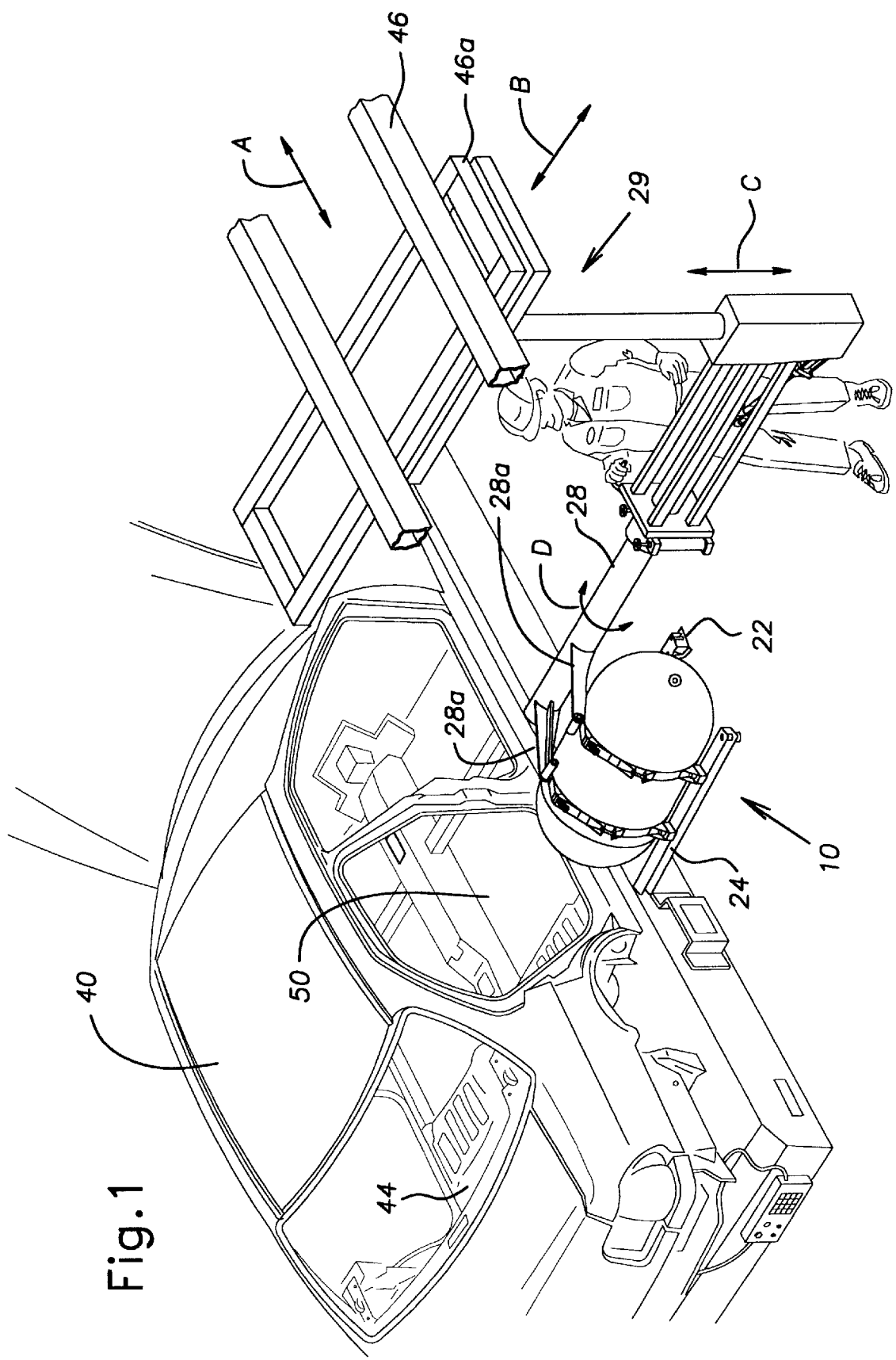
FIG. 1 schematically illustrates a portion of an automobile assembly line including a tank installation machine and a CNG tank assembly according to the present invention.

With reference to FIG. 1, the CNG tank assembly 10 is shown attached to the supporting arm 28 of the tank installation machine 29. More specifically, the supporting arm 28 has a pair of extensions 28a which are secured to the receptacles 26, preferably with a quick disconnect coupling. As illustrated, the tank installation machine 29 is movably mounted to an overhead-type trolley or supporting rail 46. Accordingly, the tank installation machine 29 is adapted for movement parallel to the direction of movement of the automobile 40 on the assembly line (arrow "A"). Moreover, by means of a transverse slide 46a, the tank installation machine 29 and the CNG tank assembly 10 are movable in a direction (arrow "B") perpendicular to the direction of travel of the automobile to permit insertion of the tank assembly 10 into the automobile 40 via an opening 50 therein. The arm 28 of the tank installation machine 29 is mounted for vertical movement (arrow "C") and rotary movement (arrow "D") about the longitudinal axis of the arm 28.

In the preferred embodiment, the CNG tank assembly 10 is inserted through a rear passenger-side door opening 50 of the automobile 40. Naturally, the opening could be provided by the opposite rear door opening.

With continued reference to FIG. 1 and further reference to FIGS. 4–7, the tank installation method according to the present invention will be hereafter described.

Figure 4:
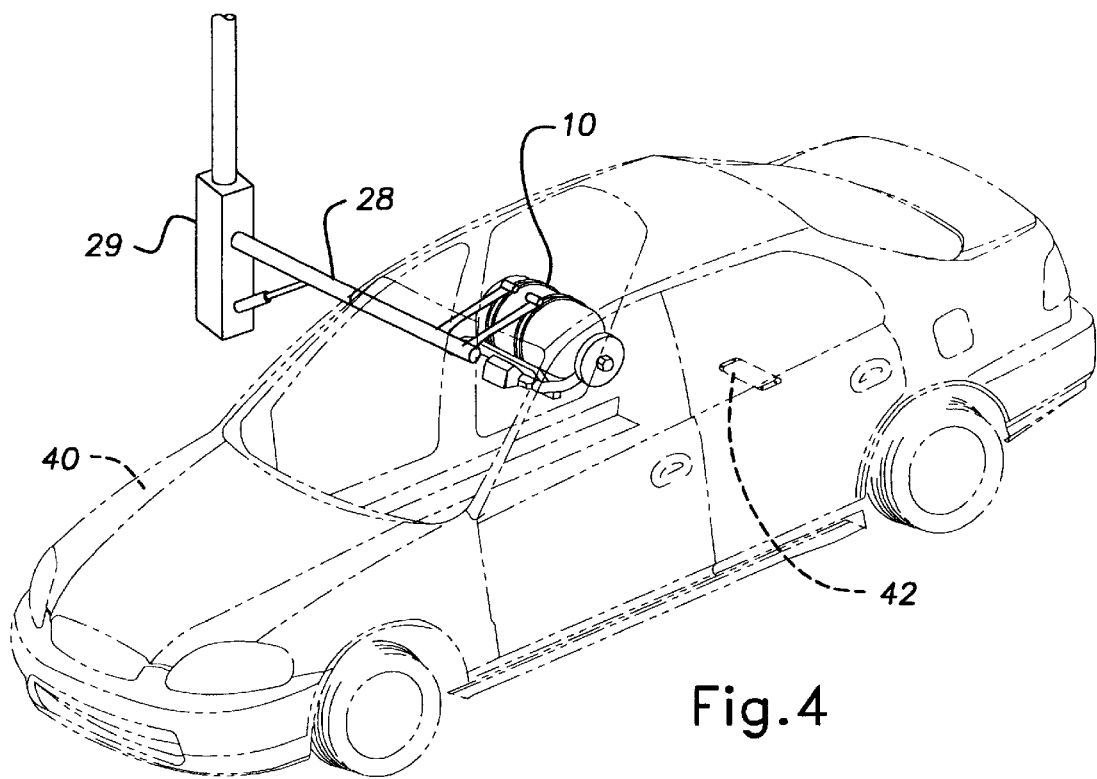
FIG. 4 schematically illustrates a first step of the CNG tank assembly installation process.

FIGS. 1 and 4 illustrate the tank installation machine 29 secured to the CNG tank assembly 10 prior to insertion of the CNG tank assembly 10 in the automobile 40. Under some circumstances, it may be necessary to raise the arm 28 and tank assembly 10 vertically prior to insertion into the automobile.

Figure 5:
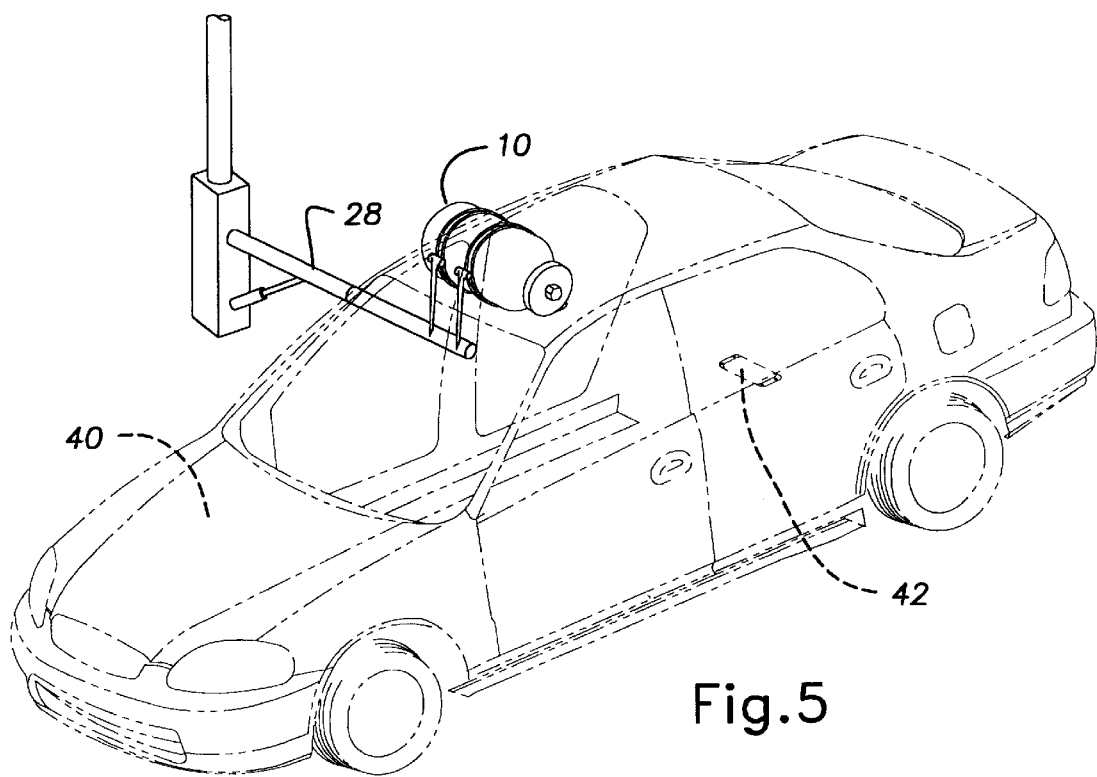
FIG. 5 schematically illustrates a second step of the CNG tank installation process wherein a tank installation machine arm and CNG tank have been lifted and rotated from the beginning position shown in FIG. 4 into an installation position.

FIG. 5 illustrates the tank assembly 10 in an angled or rotated position wherein the arm 28 of the CNG tank installation machine 29 has been rotated a predetermined angular amount about its longitudinal axis. Preferably, the arm 28 is rotated between about 20° to 80°. More preferably, the arm 28 is rotated about 60°. As such, in the angled orientation, the joint box 16 and front supporting leg 22 are relatively rearwardly facing.

Figure 6:
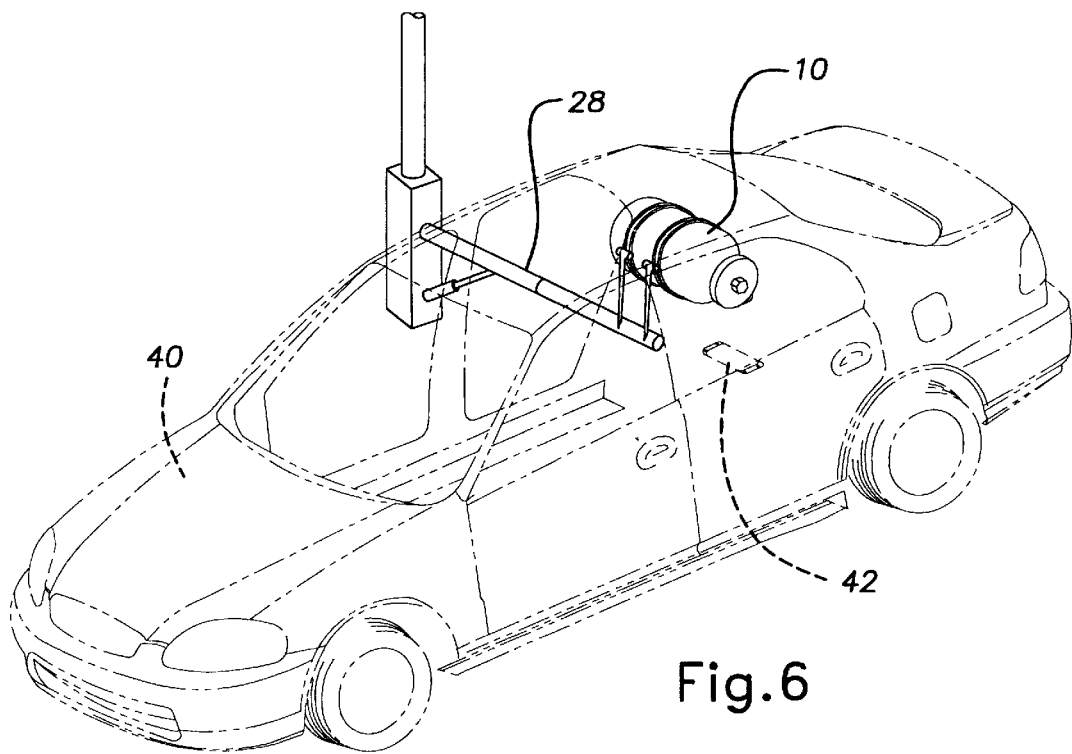
FIG. 6 illustrates a third step of the CNG tank assembly installation process wherein the CNG tank assembly has been inserted into the interior of the automobile; and, FIG. 7 illustrates a further installation step wherein the CNG tank assembly and tank installation machine arm, relative to the position shown in FIG. 6, have been rotated and moved rearwardly.
Figure 7:
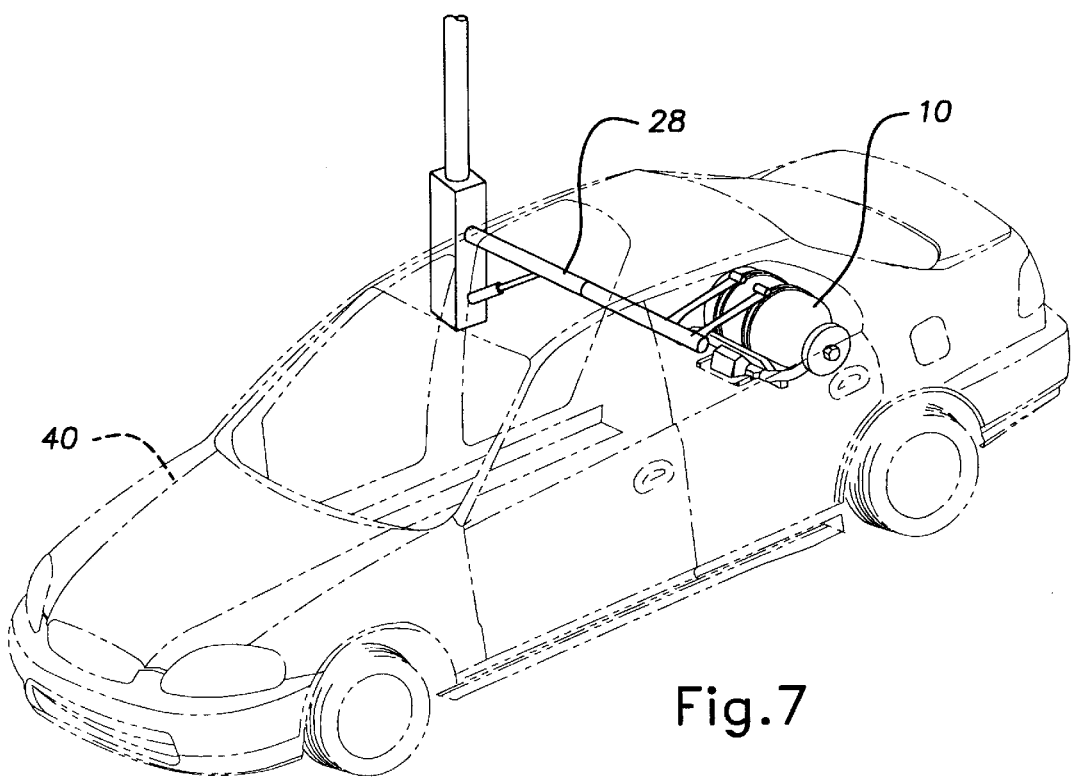

With reference to FIG. 6, the CNG tank assembly 10 is shown inserted into the automobile 40 via the rear passenger-side door opening 50. The CNG tank assembly 10 is maintained in the rotated or angled position during insertion. Once inserted into the interior of the automobile 40, the arm 28 is rotated in an opposite direction the predetermined angular amount to return the CNG tank assembly 10 to the original orientation (legs 22, 24 beneath the tank 12). In some body styles, the joint box 16 will now be placed over and in alignment with the opening 42 in the bottom panel 44 of the automobile 40. In other body styles, the tank installation machine 29 is moved rearwardly relative to the automobile to position the joint box 16 relatively over and in alignment with the opening 42 in the bottom panel 44 of the automobile 40. The arm 28 is then lowered to insert the joint box 16 into the opening 42 (FIG. 7). The arm 28 is then disconnected from the tank assembly 10 and withdrawn from the automobile 40, and the legs 22, 24 are thereafter mechanically affixed to the bottom panel 44.

Figure 2:
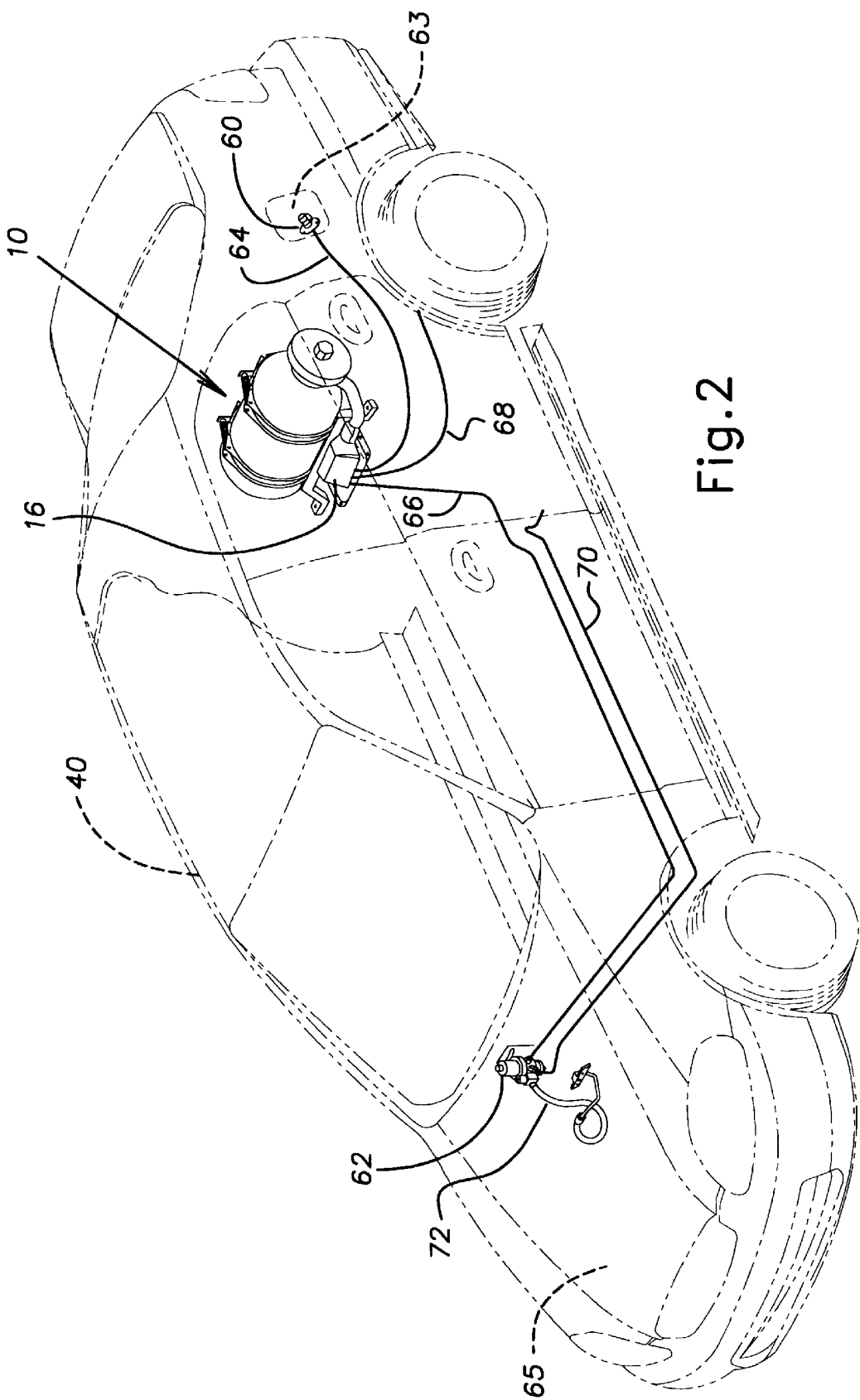
FIG. 2 schematically illustrates an automobile CNG fuel system.

The CNG tank assembly 10 is just one component in a CNG fuel system. With reference to FIG. 2, the CNG fuel system is shown to also include a filling receptacle 60, a pressure regulating assembly 62, and a series of conduits. Generally speaking, the filling receptacle 60 is disposed in a filling chamber 63 that is accessible from an exterior of the automobile 40. Compressed natural gas is injected through the filling receptacle 60 and flows through a filling conduit 64. The filling conduit 64 extends from the filling receptacle 60 to a port (not shown) on an underside of the joint box 16. The filling conduit 64 is in fluid communication with the tank 12 by means of a further conduit (not shown) which extends through the conduit 34.

Similarly, a supply conduit 66 extends from a port (not shown) on the underside of the joint box 16 and communicates with the pressure regulating assembly 62. The supply conduit is in fluid communication with the tank 12 by means of a pipe (not shown) which extends through the conduit 34. The pressure regulating assembly 62 is disposed in an engine compartment 65 of the automobile 40 and is operable to provide compressed natural gas, on demand, to the engine (not shown) via a fuel rail 72. A first vent conduit 68, which is in fluid communication with an interior of the tank 12, extends from the joint box 16 and a second vent conduit 70 extends from the pressure regulating assembly 62.

While the preferred embodiment of the present invention is shown and described herein, it is to be understood that the same is not so limited but shall cover and include any and all modifications thereof which fall within the purview of the invention.

What is claimed is:

1. A method for installing a compressed natural gas tank assembly in an automobile, wherein said tank assembly comprises a compressed natural gas tank and means for securing said tank assembly to a movable arm, said arm defining an axis, comprising the steps of:

securing said arm to said tank assembly;
rotating said tank assembly about said axis a predetermined amount in a first direction;
inserting said tank assembly through an opening in the automobile;
rotating the tank assembly about the axis the predetermined amount in a second direction, said second direction being opposite to said first direction;
releasing said arm from said tank assembly;
securing the tank assembly to an interior surface of the automobile.

2. A method for installing a compressed natural gas tank assembly in an automobile according to claim 1, wherein said tank assembly further comprises a joint box and said interior surface of the automobile defines an opening, comprising the further steps of:

aligning said joint box with said opening; and,
inserting said joint box into said opening.

3. A method for installing a compressed natural gas tank assembly in an automobile according to claim 2, wherein said aligning step includes moving said tank assembly rearwardly relative to said automobile.

4. A method for installing a compressed natural gas tank assembly in an automobile according to claim 1, comprising the further step of lifting said tank assembly vertically prior to rotating said tank assembly in said first direction.

5. A method for installing a compressed natural gas tank assembly in an automobile according to claim 3, comprising the further step of lowering said tank assembly vertically after rotating said tank assembly in said second direction.

6. A method for installing a compressed natural gas tank assembly in an automobile according to claim 3, comprising the further step of lifting said tank assembly vertically prior to rotating said tank assembly in said first direction.

7. A method for installing a compressed natural gas tank assembly in an automobile according to claim 6, comprising the further step of lowering said tank assembly vertically after rotating said tank assembly in said second direction.

8. A method for installing a compressed natural gas tank assembly in an automobile, comprising the steps of:

rotating said tank assembly about an axis a predetermined amount in a first direction;

inserting said tank assembly through an opening in the automobile;

rotating the tank assembly about said axis the predetermined amount in a second direction, said second direction being opposite to said first direction;

positioning said tank assembly in a desired location within said automobile; and, securing said tank assembly to said automobile.

9. A method according to claim 8, wherein said positioning step includes the further steps of:

moving said tank assembly rearwardly relative to said automobile;

aligning said tank assembly with a receptacle provided by said automobile; and, lowering said tank assembly into engagement with the desired location.

* * * * *